:(12) United States Patent
Liang et al.

(10) Patent No.: US 8,300,696 B2
(45) Date of Patent: Oct. 30, 2012

(54) TRANSCODING FOR SYSTEMS OPERATING UNDER PLURAL VIDEO CODING SPECIFICATIONS

(75) Inventors: Liang Liang, Lafayette, IN (US); Norman Cheng, Fremont, CA (US); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 951 days.

(21) Appl. No.: 12/180,501

(22) Filed: Jul. 25, 2008

(65) Prior Publication Data

US 2010/0020878 A1    Jan. 28, 2010

(51) Int. Cl.
*H04N 7/12* (2006.01)
(52) U.S. Cl. .................................. 375/240.16
(58) Field of Classification Search ............. 375/240.01, 375/240.12, 240.16, 240.18, 240.22, 240.24
See application file for complete search history.

(56) References Cited

U.S. PATENT DOCUMENTS

| | | | |
|---|---|---|---|
| 4,216,504 A | 8/1980 | Boussina et al. |
| 4,504,852 A | 3/1985 | Ducret |
| 4,881,125 A | 11/1989 | Krause |
| 5,187,575 A | 2/1993 | Lim |
| 5,218,435 A | 6/1993 | Lim et al. |
| 5,262,854 A | 11/1993 | Ng |
| 5,329,309 A | 7/1994 | Dorricott et al. |
| 5,377,051 A | 12/1994 | Lane et al. |
| 5,426,464 A | 6/1995 | Casavant et al. |
| 5,444,491 A | 8/1995 | Lim |
| 5,485,210 A | 1/1996 | Lim et al. |
| 5,606,359 A | 2/1997 | Youden et al. |
| 5,614,952 A | 3/1997 | Boyce et al. |
| 5,646,693 A | 7/1997 | Cismas |
| 5,703,966 A | 12/1997 | Astle |
| 5,742,829 A | 4/1998 | Davis et al. |
| 5,748,789 A | 5/1998 | Lee et al. |
| 5,764,992 A | 6/1998 | Kullick |
| 5,812,787 A | 9/1998 | Astle |
| 5,828,370 A | 10/1998 | Moeller et al. |
| 5,835,149 A | 11/1998 | Astle |
| 5,835,151 A | 11/1998 | Sun et al. |
| 5,836,003 A | 11/1998 | Sadeh |

(Continued)

FOREIGN PATENT DOCUMENTS

DE    198 10 814 A1    9/1999

(Continued)

OTHER PUBLICATIONS

U.S. Final Office Action cited in U.S. Appl. No. 10/663,037 mailed Nov. 24, 2009.

(Continued)

*Primary Examiner* — Frank Duong
(74) *Attorney, Agent, or Firm* — Merchant & Gould

(57) ABSTRACT

A system and method that computes a threshold based on an average sum of absolute residual (SAR) values and a standard deviation, each SAR corresponding to the sum of absolute values of the residual signal of a non-intra encoded macroblock in a frame of a first video stream encoded according to a first video specification, decodes the macroblocks of the frame, compares a SAR of one of the macroblocks to the threshold, the one of the macroblocks having a first motion vector; and provides the first motion vector for encoding the one of the macroblocks according to a second video specification if the SAR of the one of the macroblocks is less than the threshold.

18 Claims, 11 Drawing Sheets

U.S. PATENT DOCUMENTS

| | | | |
|---|---|---|---|
| 5,844,620 A | 12/1998 | Coleman et al. | |
| 5,929,911 A | 7/1999 | Cheney et al. | |
| 5,953,506 A | 9/1999 | Kalra et al. | |
| 5,956,026 A | 9/1999 | Ratakonda | |
| 5,959,684 A | 9/1999 | Tan et al. | |
| 5,982,360 A | 11/1999 | Wu et al. | |
| 5,995,095 A | 11/1999 | Ratakonda | |
| 6,006,034 A | 12/1999 | Heath et al. | |
| 6,009,231 A | 12/1999 | Aoki et al. | |
| 6,043,838 A | 3/2000 | Chen | |
| 6,072,531 A | 6/2000 | Shibano | |
| 6,072,532 A | 6/2000 | Chieh et al. | |
| 6,084,908 A | 7/2000 | Chiang et al. | |
| 6,137,948 A | 10/2000 | Moon et al. | 386/68 |
| 6,148,027 A | 11/2000 | Song et al. | |
| 6,157,396 A | 12/2000 | Margulis et al. | |
| 6,201,927 B1 | 3/2001 | Comer | |
| 6,208,692 B1 | 3/2001 | Song et al. | |
| 6,222,979 B1 | 4/2001 | Willis et al. | |
| 6,233,253 B1 | 5/2001 | Settle et al. | |
| 6,326,964 B1 | 12/2001 | Snyder et al. | |
| 6,353,633 B1 | 3/2002 | Her | |
| 6,360,015 B1 | 3/2002 | Bakhmutsky et al. | |
| 6,400,764 B1 | 6/2002 | Bakhmutsky | |
| 6,408,101 B1 | 6/2002 | Krishnamurthy et al. | |
| 6,414,991 B1 | 7/2002 | Yagasaki et al. | |
| 6,430,317 B1 | 8/2002 | Krishnamurthy et al. | |
| 6,434,196 B1 | 8/2002 | Sethuraman et al. | |
| 6,434,197 B1 | 8/2002 | Wang et al. | |
| 6,441,754 B1 | 8/2002 | Wang et al. | |
| 6,477,562 B2 | 11/2002 | Nemirovsky et al. | |
| 6,532,593 B1 | 3/2003 | Moroney | |
| 6,535,559 B2 | 3/2003 | Yagasaki et al. | |
| 6,560,371 B1 | 5/2003 | Song et al. | |
| 6,570,579 B1 | 5/2003 | MacInnis et al. | |
| 6,608,625 B1 | 8/2003 | Chin et al. | |
| 6,618,507 B1 | 9/2003 | Divakaran et al. | |
| 6,643,328 B2 | 11/2003 | Yagasaki et al. | |
| 6,654,539 B1 | 11/2003 | Duruöz et al. | 386/68 |
| 6,658,157 B1 | 12/2003 | Satoh et al. | |
| 6,658,199 B1 | 12/2003 | Hallberg | |
| 6,671,322 B2 | 12/2003 | Vetro et al. | |
| 6,671,454 B1 | 12/2003 | Kaneko et al. | |
| 6,690,881 B1 | 2/2004 | Tomita et al. | 386/117 |
| 6,700,622 B2 | 3/2004 | Adams et al. | |
| 6,735,253 B1 | 5/2004 | Chang et al. | |
| 6,766,407 B1 | 7/2004 | Lisitsa et al. | |
| 6,768,774 B1 | 7/2004 | MacInnis et al. | |
| 6,847,778 B1 | 1/2005 | Vallone et al. | |
| 6,876,703 B2 | 4/2005 | Ismaeil et al. | |
| 6,909,749 B2 | 6/2005 | Yang et al. | |
| 6,931,064 B2 | 8/2005 | Mori et al. | |
| 6,996,838 B2 | 2/2006 | Rodriguez | |
| 7,010,040 B2 * | 3/2006 | Kim | 375/240.16 |
| 7,027,713 B1 | 4/2006 | Hallberg | |
| 7,050,499 B2 | 5/2006 | Kodama et al. | |
| 7,079,578 B2 | 7/2006 | Segev | |
| 7,154,560 B1 | 12/2006 | Chang et al. | |
| 7,233,622 B2 | 6/2007 | Winger et al. | |
| 7,274,857 B2 | 9/2007 | Nallur et al. | |
| 7,302,002 B2 | 11/2007 | Yagasaki et al. | |
| 7,324,595 B2 | 1/2008 | Cote et al. | |
| 7,327,786 B2 * | 2/2008 | Winger et al. | 375/240.12 |
| 7,356,082 B1 | 4/2008 | Kuhn | |
| 7,391,809 B2 * | 6/2008 | Li et al. | 375/240.12 |
| 7,869,505 B2 | 1/2011 | Rodriguez et al. | |
| 2001/0014206 A1 | 8/2001 | Artigalas et al. | 386/83 |
| 2002/0009149 A1 | 1/2002 | Rodriguez et al. | |
| 2002/0039483 A1 | 4/2002 | Frost et al. | |
| 2002/0044762 A1 | 4/2002 | Wood et al. | |
| 2002/0071663 A1 | 6/2002 | O'Donnel | |
| 2003/0001964 A1 | 1/2003 | Masukura et al. | |
| 2003/0066084 A1 | 4/2003 | Kaars | |
| 2003/0093800 A1 | 5/2003 | Demas et al. | |
| 2003/0098924 A1 | 5/2003 | Adams et al. | |
| 2003/0103604 A1 | 6/2003 | Kato et al. | |
| 2003/0113098 A1 | 6/2003 | Willis | |
| 2003/0147631 A1 | 8/2003 | Zimmermann | 386/95 |
| 2003/0170003 A1 | 9/2003 | Levesque et al. | |
| 2003/0233663 A1 | 12/2003 | Rao et al. | |
| 2004/0055020 A1 | 3/2004 | Delpuch | |
| 2004/0062313 A1 * | 4/2004 | Schoenblum | 375/240.25 |
| 2004/0218680 A1 | 11/2004 | Rodriguez et al. | |
| 2005/0022245 A1 | 1/2005 | Nallur et al. | |
| 2005/0074063 A1 | 4/2005 | Nair et al. | |
| 2006/0013568 A1 | 1/2006 | Rodriguez | |
| 2006/0093320 A1 | 5/2006 | Hallberg et al. | |
| 2007/0286581 A1 | 12/2007 | Boston et al. | |
| 2008/0031337 A1 * | 2/2008 | Hasegawa et al. | 375/240.16 |
| 2008/0037952 A1 | 2/2008 | Nallur et al. | |
| 2008/0037957 A1 | 2/2008 | Nallur et al. | |
| 2008/0253464 A1 | 10/2008 | Rodriguez et al. | |
| 2008/0260024 A1 * | 10/2008 | Chen et al. | 375/240.03 |
| 2008/0279284 A1 | 11/2008 | Rodriguez et al. | |
| 2009/0033791 A1 | 2/2009 | Rodriguez et al. | |

FOREIGN PATENT DOCUMENTS

| | | |
|---|---|---|
| EP | 0 595 323 A2 | 5/1994 |
| EP | 1 026 899 A1 | 8/2000 |
| EP | 1 161 089 A2 | 12/2001 |
| EP | 1 195 995 A2 | 4/2002 |
| JP | 5-49000 | 2/1993 |
| JP | 10-243344 | 10/1998 |
| JP | 10-271498 | 10/1998 |
| JP | 11-18063 | 1/1999 |
| JP | 11-196411 | 7/1999 |
| JP | 02-500851 | 1/2002 |
| JP | 03-087785 | 3/2003 |
| JP | 03-102008 | 4/2003 |
| WO | WO 96/10889 | 4/1996 |
| WO | WO 97/15149 | 4/1997 |
| WO | WO 99/12097 | 3/1999 |
| WO | WO 99/22517 | 5/1999 |
| WO | WO 01/13625 A1 | 2/2001 |
| WO | WO 02/43385 A2 | 5/2002 |

OTHER PUBLICATIONS

U.S. Final Office Action cited in U.S. Appl. No. 10/891,318 mailed Dec. 1, 2009.

EP Examination cited in 00 984 341.8 mailed Dec. 14, 2009.

EP Examination cited in 08 150 948.1 mailed Dec. 17, 2010.

Simonson et al., "Version augmented URIs for reference permanencevia an Apache module design," Computer Networks and ISDN Systems, North Holland Publishing, Amsterdam, NL, vol. 30, Apr. 1-7, 1998, pp. 337-345.

International Preliminary Report on Patentability and Written Opinion cited in PCT/US2008/070856 mailed Feb. 2, 2010.

U.S. Final Office Action cited in U.S. Appl. No. 09/736,661 mailed Mar. 9, 2010.

Canadian Office Action cited in Application No. 2,573,906 mailed Apr. 7, 2011.

U.S. Non-Final Office Action cited in U.S. Appl. No. 10/891,318 mailed Mar. 15, 2011.

Canadian Office Action cited in Application No. 2,539,120 mailed Mar. 9, 2010.

EP Examination cited in 05 764 529.3 mailed Jun. 18, 2010.

Canadian Office Action cited in Application No. 2,573,906 mailed Aug. 9, 2010.

Canadian Office Action cited in Application No. 2,472,244 mailed Apr. 3, 2008.

Canadian Office Action cited in Application No. 2,573,906 mailed Apr. 1, 2009.

EP Communication Pursuant to Article 94(3) EPC cited in 00 984 341.8 mailed May 19, 2009.

EP Communication Pursuant to Article 94(3) EPC cited in 02 794 331.5 mailed Jan. 12, 2009.

International Search Report cited in PCT/US00/33837 mailed Mar. 1, 2001.

International Search Report cited in PCT/US02/40828 mailed Apr. 21, 2003.

International Search Report and Written Opinion cited in PCT/US2004/030012 mailed Dec. 27, 2004.

International Search Report and Written Opinion cited in PCT/US2005/024706 mailed Oct. 18, 2005.
International Search Report and Written Opinion cited in PCT/US2008/070856 mailed Dec. 15, 2008.
Japanese Office Action cited in 2001-546180 mailed Mar. 30, 2007.
Japanese Office Action cited in 2001-546180 mailed Jun. 9, 2008.
Japanese Final Office Action cited in 2001-546180 mailed Jun. 18, 2009.
Richardson, I. et al., "Video codec complexity management," *Proc. International Picture Coding Symposium* (*PCS01*), Seoul, Korea, 4 pages (Apr. 2001).
Topiwala, P., "Status of the emerging ITU-T/H.264| ISO/MPEG-4, Part 10 Video coding standard," *Proceedings of SPIE*, vol. 4790, pp. 261-277 (Jul. 8, 2002).
Written Opinion cited in PCT/US00/33837 mailed Dec. 27, 2001.
Written Opinion cited in PCT/US02/40828 mailed Dec. 16, 2003.
U.S. Non-Final Office Action cited in U.S. Appl. No. 09/736,661 mailed Aug. 24, 2001.
U.S. Final Office Action cited in U.S. Appl. No. 09/736,661 mailed Apr. 10, 2002.
U.S. Non-Final Office Action cited in U.S. Appl. No. 09/736,661 mailed Mar. 26, 2003.
U.S. Non-Final Office Action cited in U.S. Appl. No. 09/736,661 mailed Oct. 20, 2003.
U.S. Non-Final Office Action cited in U.S. Appl. No. 09/736,661 mailed Jul. 19, 2004.
U.S. Final Office Action cited in U.S. Appl. No. 09/736,661 mailed Sep. 22, 2005.
U.S. Non-Final Office Action cited in U.S. Appl. No. 09/736,661 mailed Jul. 17, 2006.
U.S. Final Office Action cited in U.S. Appl. No. 09/736,661 mailed Jan. 3, 2007.
U.S. Non-Final Office Action cited in U.S. Appl. No. 09/736,661 mailed Sep. 11, 2007.
U.S. Final Office Action cited in U.S. Appl. No. 09/736,661 mailed Apr. 11, 2008.
U.S. Non-Final Office Action cited in U.S. Appl. No. 09/736,661 mailed Jul. 29, 2008.
U.S. Non-Final Office Action cited in U.S. Appl. No. 09/736,661 mailed Mar. 3, 2009.
U.S. Non-Final Office Action cited in U.S. Appl. No. 10/663,037 mailed Dec. 10, 2007.
U.S. Non-Final Office Action cited in U.S. Appl. No. 10/663,037 mailed Jun. 27, 2008.
U.S. Final Office Action cited in U.S. Appl. No. 10/663,037 mailed Dec. 10, 2008.
U.S. Non-Final Office Action cited in U.S. Appl. No. 10/663,037 mailed May 14, 2009.
U.S. Non-Final Office Action cited in U.S. Appl. No. 10/854,874 mailed May 13, 2008.
U.S. Non-Final Office Action cited in U.S. Appl. No. 10/854,874 mailed Dec. 15, 2008.
U.S. Final Office Action cited in U.S. Appl. No. 10/854,874 mailed Jun. 11, 2009.
U.S. Non-Final Office Action cited in U.S. Appl. No. 10/891,318 mailed Mar. 19, 2009.
U.S. Final Office Action cited in U.S. Appl. No. 10/623,683 mailed Jul. 25, 2008.
U.S. Non-Final Office Action cited in U.S. Appl. No. 10/623,683 mailed Dec. 28, 2007.
Japanese Final Office Action cited in 2006-526399 mailed Sep. 29, 2009.
U.S. Non-Final Office Action cited in U.S. Appl. No. 09/736,661 mailed Sep. 16, 2009.

* cited by examiner

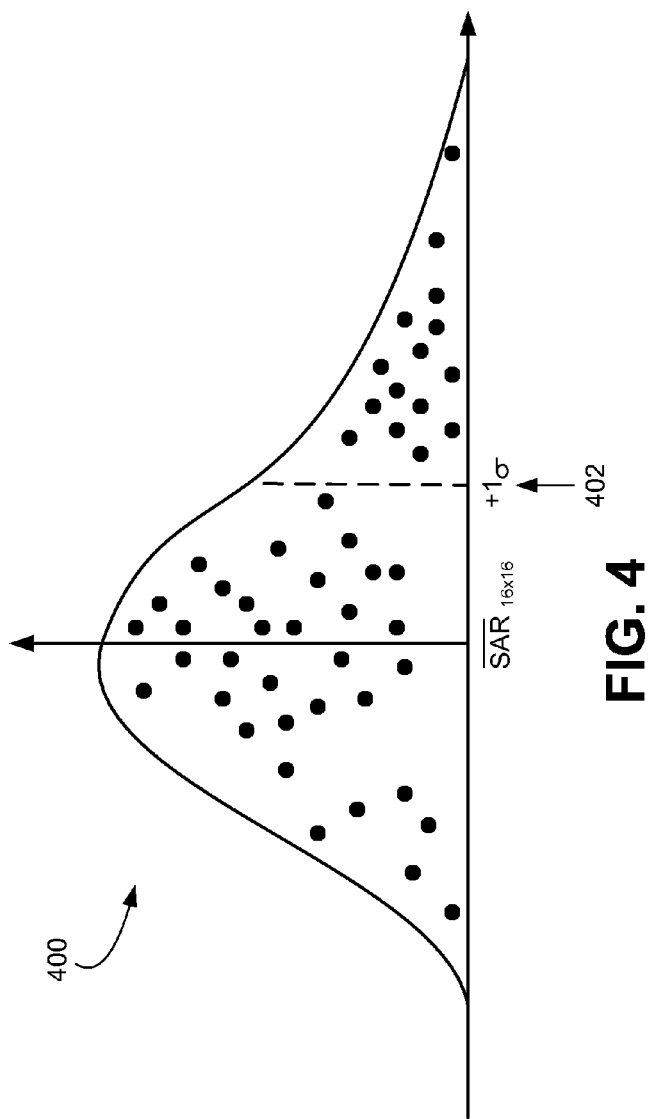
FIG. 4
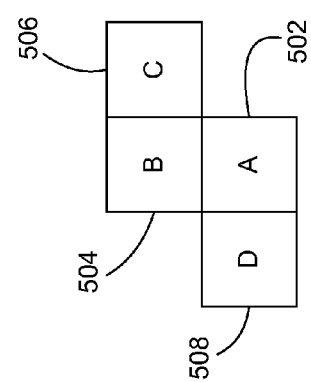
FIG. 5B
FIG. 5A

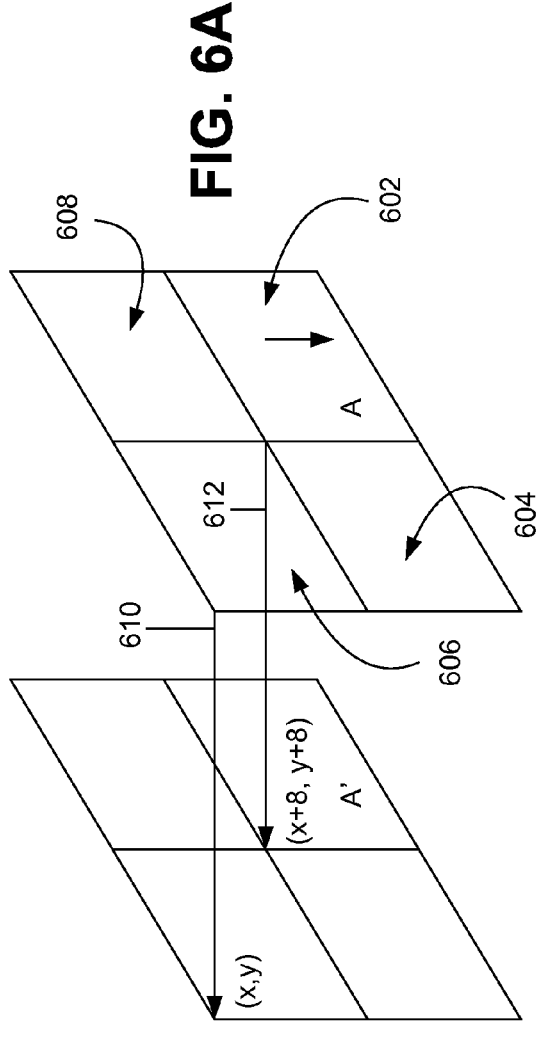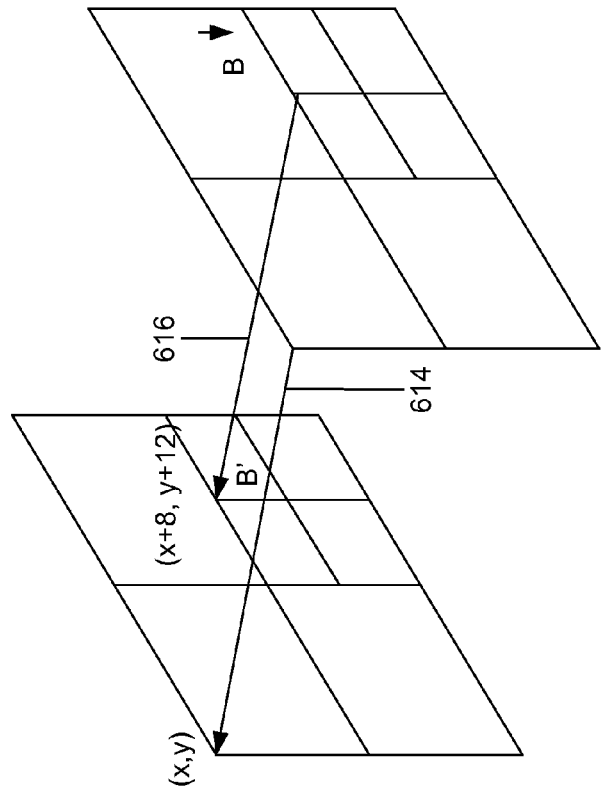

TRANSCODING FOR SYSTEMS OPERATING UNDER PLURAL VIDEO CODING SPECIFICATIONS

TECHNICAL FIELD

Particular embodiments are generally related to processing of video streams.

BACKGROUND

Video conferencing is a popular way of long distance communication nowadays. Many kinds of products have appeared in the markets and gained great attention through their ability to save large amounts of time and expenses by enabling the conducting of conversations for people that are not in the same location.

As video technology keeps improving, new video standards have emerged in recent years, such as H.264/AVC (herein, AVC). AVC represents a significant advance in coding efficiency compared to previous video standards, such as H.263, H.261, and MPEG-2. Because of its superior improvement in video data compression and high decoded video quality, AVC is rapidly becoming more widely used in recent years. However, not all products that are based on the previous video standards can be replaced with AVC-based products in a short time. Accordingly, there has been a focus recently on providing transcoders that implement video format conversion in view of AVC. However, engineering and design of transcoders and corresponding methods involving AVC are not without challenges.

For instance, although AVC enables significant gains in bit rate savings and visual quality improvement, it is also more computationally extensive due, for instance, to its comprehensive motion compensated estimation process. For instance, distinct from previous standards, AVC extends the partition choices for motion estimation to seven (7) sizes for P frames: 16×16, 16×8, 8×16, 8×8, 8×4, 4×8 and 4×4. Further, for frames, there are four (4) modes to choose from for 16×16 macroblocks (MBs), while for 4×4 blocks, there are nine (9) different modes from which to choose. AVC also enlarges the range of the reference frames up to sixteen (16) decoded frames. For B frames, besides the same amount of mode choices, there are two lists of reference frames to choose from. For each 16×16 MB, the motion search process may exhaustively compute the cost of all the modes and selects the one resulting in the minimum cost. This motion search process is computationally extensive and time consuming. Therefore, many transcoding techniques have been proposed, and several methods on reducing the complexity of the motion estimation process have been presented (e.g., with a focus toward reducing the complexity of the motion estimation process in AVC encoding in the direction of converting H.263 video stream to AVC streams).

Other challenges are involved in transcoder development. For instance, other than motion estimation, AVC applies integer precision transform to the predicted error signals in more than one block size. Context adaptive entropy coding also presents some computational challenges. Another challenge involves the fact that, typically, a pixel domain deblocking filter is employed in AVC to reduce the blocking artifacts because of the block based encoding process. In view of this in-loop deblocking filter function, the H.263 decoded predicted error signals cannot be directly used if corresponding H.263 motion vectors are to be reused in AVC encoding.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed embodiments. Moreover, in the drawings, like reference numerals designate corresponding parts throughout the several views.

FIG. 4 is a schematic diagram that illustrates a simulated example distribution of a sum of absolute residuals (SAR) for a frame.

FIGS. 5A-5B are block diagrams that conceptually illustrate motion vector prediction.

FIGS. 6A-6B are block diagrams that conceptually illustrate motion vector mapping from an H.263 motion vector.

BRIEF SUMMARY OF THE INVENTION

A system and method that computes a threshold based on an average sum of absolute residual (SAR) values and a standard deviation, each SAR corresponding to the sum of absolute values of the residual signal of a non-intra encoded macroblock in a frame of a first video stream encoded according to a first video specification, decodes the macroblocks of the frame, compares a SAR of one of the macroblocks to the threshold, the one of the macroblocks having a first motion vector; and provides the first motion vector for encoding the one of the macroblocks according to a second video specification if the SAR of the one of the macroblocks is less than the threshold.

DESCRIPTION OF EXAMPLE EMBODIMENTS

One approach to enhance the flexibility of use between old and new products in video systems is through the use of transcoding technology that converts video bit streams corresponding to different video compression specifications, such as standards. Disclosed herein are transcoding systems and methods (herein, collectively also referred to as transcoding systems), which possess the ability to bridge the communication between different video specifications or standards using low complexity and time-saving transcoding methods. A transcoding method is described that, in one embodiment, reuses video information of a first video specification (such as H.263) bit stream and the corresponding decoded video data, or parts thereof, to conduct a simple but effective motion re-estimation process. Such a method enables the reduction or possibly omission of the computation in a second video specification's (such as AVC) motion estimation process, resulting in a significant reduction in complexity and transcoding time. It should be understood that, although the various embodiments involve the use of a transcoding system having an H.263 decoder and AVC encoder, other video specifications or standards (e.g., first and second video specifications other than H.263 and/or AVC) may be used.

Figure 1:
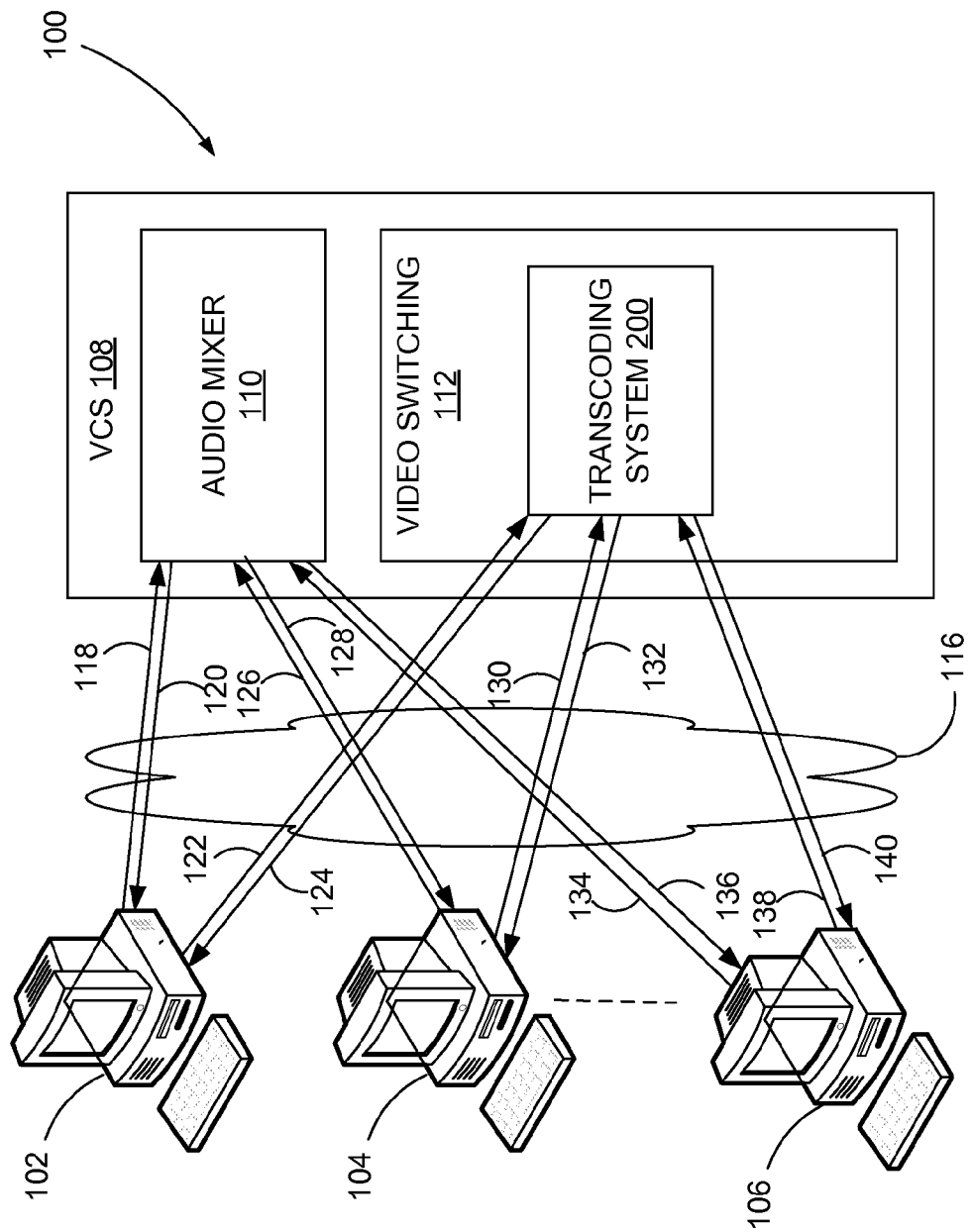
FIG. 1 is a block diagram that illustrates an example environment in which embodiments of a transcoding system may be implemented.

FIG. 1 is a block diagram that illustrates an example environment in which an embodiment of a transcoding system can be implemented, namely a video conferencing network 100. Although described in the context of a video conferencing system, it should be understood in the context of the present disclosure that transcoding systems and methods described herein can be implemented in other systems or environments that benefit from transcoding technology. The video conferencing network 100 includes plural end point devices 102, 104, and 106, and a video conferencing system (VCS) 108, which includes an audio mixer 110 and a video switching module 112. The video switching module 112 comprises a transcoding system 200. The end point devices 102, 104, and 106 communicate information to each other via the video conferencing system 108 over a communication medium 116, which may include a local area network, wide area network, among other media that enables wireless and/or wired communication. In general, the video conferencing network 100 provides an environment where basic, multi-points video conferencing is conducted between several end point devices 102, 104, and 106. Though illustrated as computer-type devices 102, 104, and 106, other types of devices (e.g., set-top terminals, televisions, phones with video capability, media play/record devices, etc.) are contemplated to be within the scope of devices suitable for interfacing with the transcoding system 200. Further, in some embodiments, functionality of the end point devices 102 and the transcoding system 200 may be embodied within a single device, where the communication medium may be in the form of wires, busses, fiber, or other mediums, or wireless.

In one embodiment, each end point device 102, 104, and 106 is equipped with a TV/PC interface, a microphone and a camera (the latter two components not shown) for voice and visual communication. Voice data (or hereinafter, audio) streams are sent over the communication medium 116 to the audio mixer 110, which mixes all the audio bit streams and sends the resultant mixed streams to respective end point devices 102, 104, or 106. For instance, audio streams 118, 126, and 134 are provided by respective end point devices 102, 104, and 106 to audio mixer 110, which mixes the audio streams and provides mixed audio streams 120, 128, and 136 to end point devices 102, 104, and 106, respectively. Also, the video bit streams 122, 130, and 138 are sent to the video switching module 112, which switches the video bit stream to the current active one. In other words, in one embodiment, only the video stream of the current speaker is broadcasted to each end-point.

The transcoding system 200 is configured to convert the received video stream 122, 130, and 138, provided according to a first video coding specification or standard, to a video stream 124, 132, and 140 provided to the end points according to a second video specification or standard. For instance, end point device 102 may be configured to operate using the H.263 video coding standard, and accordingly, video streams 122 and 124 are configured as H.263 video streams. End point devices 104 and 106, on the other hand, may operate using the H.264 video coding standard, and accordingly, video streams 130, 132 and 138, 140 are configured as H.264 video streams. Thus, if during a video conferencing session, end point device 102 provides a video stream instance, the transcoding system 200 converts the corresponding H.263 video stream received from end point device 102 to an AVC stream, and provides (via video switching module 112) the AVC video streams to end point devices 104 and 106. Thus, where one or more of the end points 102, 104, 106 use different video standards, the transcoding system 200 converts video streams in accordance with the appropriate standard (e.g., as needed by the respective device), preferably in real-time.

Figure 2:
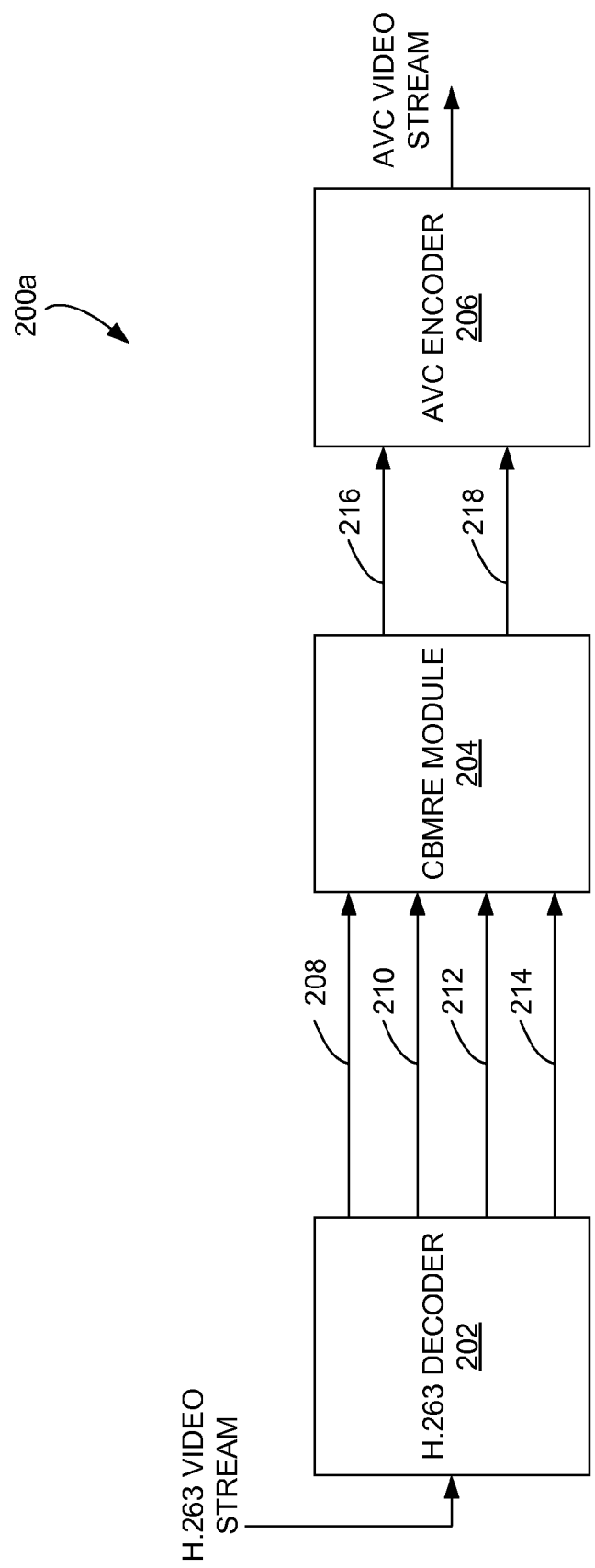
FIG. 2 is a block diagram of an embodiment of a transcoding system.

Having described an example environment in which certain embodiments of transcoding systems 200 can be implemented, attention is now directed to FIG. 2, which is a block diagram that illustrates an embodiment of the transcoding system 200 shown in FIG. 1, and referred to as transcoding system 200*a*. In general, the transcoding system 200*a* is configured to convert an H.263 video stream into an AVC video stream. One mechanism the transcoding system 200*a* uses to implement this conversion is to substitute the motion estimation process used in AVC encoding by a simple but effective motion vector re-estimation process which utilizes the incoming H.263 video information and the H.263 decoded video data. As shown in FIG. 2, the transcoding system 200*a* comprises an H.263 decoder 202, a content-based motion re-estimation (CBMRE) module 204, and an AVC encoder 206. The H.263 decoder 202 receives and processes an H.263 video stream, and responsively provides H.263 decoded frames 208, H.263 motion vectors 210, quantized DCT coefficients 212, and residuals (predicted error signals or residual signals) 214 to the CBMRE module 204. The H.263 decoded frames 208, H.263 motion vectors 210, quantized DCT coefficients 212, and residuals 214 are processed and reused in the CBMRE module 204, the latter which outputs decoded frames 216 and refined motion vectors and the corresponding MB encoding modes 218 and provides the outputs to the AVC encoder 206. The AVC encoder 206 in turn provides an AVC video stream at its output.

Figure 3:
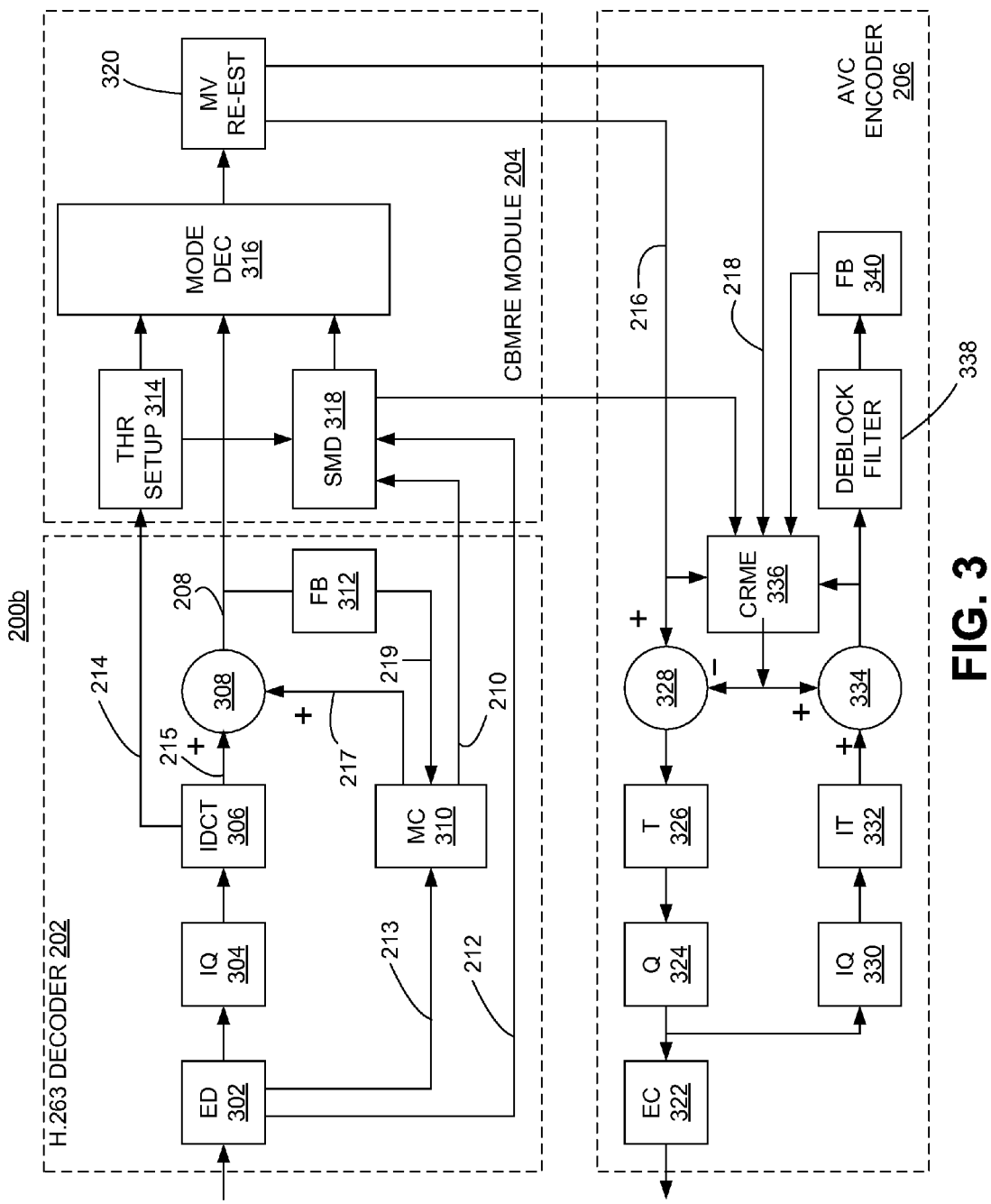
FIG. 3 is a block diagram that further illustrates the embodiment shown in FIG. 2.

A particular embodiment of a transcoding system 200*a* is shown in FIG. 3, and referred to as transcoding system 200*b*. The transcoding system 200*b* reveals a more detailed structure for each component of the transcoding system 200*a* shown in FIG. 2. The transcoder 200*b* comprises the H.263 decoder 202, CBMRE module 204, and the AVC encoder 206. The AVC encoder 206 comprises known components, such as computation reduced motion estimation (CRME) module 336 (which receives skip mode decision signals, motion vectors, and MB encoding mode signals from the CBMRE module 204), combiner module 328 (which receives decoded frames from the CBMRE module 204) and combiner module 334, transform module 326, quantizer module 324, entropy coding (EC) module 322, inverse quantizer module 330, integer transform module 332, a deblock filter 338 and a frame buffer 340 (i.e., one or more repositories for reconstructed frames that serve as reference pictures). Much of the architecture of the H.263 decoder 202 and the AVC encoder 206 are known to those having ordinary skill in the art, and hence a detailed description of devices 202 and 206 are omitted except where helpful to an understanding of the transcoding system operation.

As a brief contextual introduction, upstream of the H.263 decoder 202, as is known, a given macroblock that is non-intra coded and motion compensated has a corresponding motion vector and may have a residual signal. If the MB has a residual signal, it is typically provided as information corresponding to quantized transform coefficients. At the H.263 decoder 202, the syntax of the received video stream indicates that the given macroblock has a motion vector that motion compensates the macroblock, and possibly also a residual signal to add (e.g., if not a perfect match or when not forced to appear as a perfect match through quantizing the resulting residual to make it zero across all 256 pixels of the macroblock).

Now referring to the components of an exemplary H.263 decoder 202, the H.263 decoder 202 comprises an entropy decoding (ED) module 302 that receives a video stream (e.g., H.263 video stream) that converts entropy coded tokens to decoded information, such as motion vectors provided on line 213 and quantized DCT coefficients provided on line 212. The motion vectors (shown on line 213) are provided to a motion compensation (MC) module 310, which in accordance with the values of the motion vectors retrieves motion compensated information stored in frame buffer 312 to provide motion compensated MB information on line 217. The MC module 310 further provides its output to the CBMRE module 204 for use in skip mode processing as described below. Quantized transform (i.e., DCT) coefficients representative of a residual signal corresponding to a portion of the MB are output from the ED module 302 and input to an inverse quantizer (IQ) module 304, which dequantizes the DCT coefficients.

The dequantized coefficients are provided to an inverse discrete cosine transform (IDCT) module 306, which provides the resulting residual signal of a MB, or a portion thereof, to the CBMRE module 204 (e.g., for threshold set-up processing) as well as to combiner module 308. The combiner module 308 combines the motion compensated video on line 217 with the residuals from the IDCT module 306 to provide decoded frames, or portions thereof, that are output on line 208 to the CBMRE module 204 (e.g., for MB encoding mode decision processing) as well as passed to the frame buffer 312.

The CBMRE module 204 comprises a threshold set-up module 314, a mode decision module 316, a skip mode decision (SMD) module 318, and a motion vector re-estimation module 320. The threshold set-up module 314 is coupled to the output of the IDCT module 306 via line 214, and to the skip mode decision module 318. The mode decision module 316 is coupled to the input of the motion vector re-estimation module 320 and to the outputs of the threshold set-up module 314, the combiner module via line 208, and the skip mode decision module 318. The skip mode decision module 318 is coupled to the inputs of the mode decision module 316 and the AVC encoder 206 and to the outputs of the MC module 310 and the ED module 302 of the H.263 decoder 202, as well as to the output of the threshold set-up module 314. The motion vector re-estimation module 320 provides its output to the H.264 encoder 206. Note that, although shown logically as individual components, functionality of one or more of these components may be combined in a single component, with or without additional connections that enable communication among one or more of the components of the CBMRE module 204.

In one embodiment, the CBMRE module 204 is a separate module. In some embodiments, one or more of the internal components of the CBMRE module 204 are implemented by the same computing or processing devices implementing decoder 202. In some embodiments, decoder 202 is controlled by a microprocessor (not shown) that causes information 208, 210, 212, and 214 to be provided to CBMRE module 204.

The residual signals on line 214 are output by the IDCT module 306 and provided to the threshold set-up module 314, where a threshold value is determined. In general, during the decoding of a picture, the CBMRE module 204 (e.g., threshold set-up module 314) monitors and records (collects) the size, significance, or statistics of the residuals to determine a threshold. A threshold (or threshold value) is set up as a criterion for making decisions on partition modes. The value of the threshold enables a determination by the CBMRE module 204 as to whether each of the H.263 motion vectors is to be considered already optimal (e.g., not requiring re-calculation based on further block partition during AVC encoding) or not. In other words, the threshold enables a determination as to when to take (designate) a motion vector as a "good enough" motion vector representation for an entire MB (e.g., a 16×16 block) when re-encoding the MB in the AVC encoder 206. For example, the good enough motion vector may convey that there is no motion estimation or refinements to be done in the AVC encoder 206 as part of the transcode operation. After calculating the threshold (based on statistics of a picture or several pictures, as explained below), if the residual of a given macroblock is sufficiently low (e.g., below the threshold), then the motion vector is good enough. However, if the residual of a given macroblock is high (e.g., above the threshold), then the macroblock is a candidate to be partitioned into smaller blocks or MB sub-blocks (e.g., into 8×8 blocks, as allowed in the second video coding specification or H.264) and motion estimation is conducted for the four respective 8×8 blocks that comprise the 16×16 macroblock. In some embodiments, refinements are also possible as 16×8, 8×16 (i.e., not just 8×8), as well as further refinements from an 8×8 to 8×4, 4×8, or 4×4 blocks.

The transcoding system 200b is configured to reuse, when possible, the available video information from the H.263 decoder 202. Instead of evaluating a cost function as implemented in AVC, the CBMRE module 204 (e.g., the threshold set-up module 314) computes statistics for the sum of the absolute differences (SAD) of the non-intra coded macroblocks (e.g., the temporally predicted macroblocks) in the decoded H.263 macroblock. The residual of each non-intra coded macroblock received at H.263 decoder 202 typically corresponds to the values of the quantized SAD of its prediction from one or possibly more reference pictures to its original pixel values while the respective macroblock is being encoded (i.e., by an H.263 encoder prior to the H.263 stream reception at the H.263 decoder 202). A representation of the sum of the respective SAD for the non-intra coded MBs for the entire decoded picture or pictures is computed by adding the respective residual absolute values 214 for each macroblock in threshold set-up module 314. Note that in a video conferencing environment, video sequences typically exhibit slow motions for the majority of time. Accordingly, the residual of a MB is relevant in deciding if the motion vector is good enough or not rather than incurring more comprehensive computation or processing. Further, the re-use of H.263 motion vectors does not necessarily eliminate the motion search processing of AVC in all implementations, but rather, aids the motion estimation in AVC encoding or reduces the AVC motion search process of AVC.

The respective sum of the absolute values of each non-intra coded MB over a picture or a plurality of pictures results in a statistical distribution, called herein the residual distribution. It may not always be the case that a residual distribution comprises a symmetrical density around the mean, since video data manifests many different distributions. Some distributions may be asymmetrical or have insufficient population around the mean, for any of several reasons.

The residual distribution serves as a model to decide the thresholds, as well as MB encoding mode selections in AVC encoder 206. In the present disclosure, the sum of absolute residuals of a MB is referred to as its SAR. If the SAR of a given macroblock is smaller than the determined threshold, the H.263 motion vector for the given macroblock is considered good enough and can be reused to aid motion estimation in AVC encoding. On the other hand, if the SAR is larger than the threshold, the H.263 motion vector is not considered good enough and needs to be re-estimated by the CBMRE module 204 (e.g., the motion vector re-estimation module 320).

In one embodiment, to compute the threshold, there is a first pass over a received compressed picture (a decoding pass or partial decoding pass) that corresponds to a statistical data collection and generation phase, and then on a second pass or scan, a determination is made by the CBMRE module 204 as to whether the motion vector for each respective macroblock coded as non-intra merits keeping (i.e., is good enough). That is, during a second analysis phase, for the motion vector as produced by the prior encoding of the video stream (e.g., H.263 in accordance with a first video coding specification), it is determined if the motion vector is good enough. Note that, although the motion vector is re-used for guiding the motion estimation when the decoded pictures is AVC encoded, the corresponding residuals and the motion vector, when encoded in AVC, may differ based on differences in quantization and based on the use in AVC of quarter pel interpolation (a refinement step) that likely affects (and possibly reduces) the residual. In other words, even if the motion vector is re-used, in one embodiment, there is a refinement step to half pel granularity or two refinement steps to quarter pel granularity (or only one refinement step from half to quarter pel). Note that the motion vector of a MB in the H.263 stream may be (0,0) (i.e., the MB is temporally compensated without a motion vector such as when a portion of the video is static). In an alternate embodiment, the motion vector obtained during H.263 decoding serves to offset the search space during motion estimation in the AVC encoder 206, where such a search space is smaller than if there were no motion vector guidance from the H.263 decode operation. Accordingly, even if a given motion vector is deemed or designated as a good or optimal motion vector, the motion vector values may vary slightly in AVC during a refinement step. In such refinement steps and in some embodiments, motion estimation may be performed over a search space whose size is determined by how far the SAR of the MB was from the threshold. The shape of the search space is also determined according to the motion vector direction. Similarly, the SAR of the MB also determines the search space size for motion estimation of MB sub-blocks (e.g., macroblocks broken down to 8×8). In one embodiment, while performing the second pass (the analysis phase), the picture is fully decoded and thus it is not necessary to perform decoding of the picture again. Note that with motion vector re-use, the AVC encoder 206 may calculate the SAD since pictures in AVC are deblocked (so the residual is different).

Attention is now directed to FIG. 4, which illustrates a simulated example distribution 400 of SARs for a picture or frame. As revealed by the distribution, if the H.263's motion estimation is optimal, the SAR of each macroblock is small and the distribution of these SAR values should be around the average value of the SARs out of all the macroblocks in a frame (or multiple frames). The SAR of macroblocks not deemed to be good enough are values that deviate (to the right or higher in FIG. 4) from the mean of the SARs. In other words, distributions that are below the mean of the SARs, shown as $\overline{SAR_{16\times16}}$, demonstrate the case where the motion vector is considered good enough for reuse and/or to guide the motion estimation of the AVC encoder 206. On the other hand, distributions above $\overline{SAR_{16\times16}}$ are those that result in a large predicted error and merit breaking the MB into sub-blocks for motion estimation in AVC encoder 206.

The threshold or threshold value is chosen by evaluating the SAR distribution over one or more pictures and setting the threshold for "good enough" motion vectors as a function of the standard deviation (e.g., at one standard deviation (1°) 402). Any $SAR_{16\times16}$ above the standard deviation 402 is subject to further motion re-estimation in AVC encoder 206. The standard deviation 402 of the $SAR_{16\times16}$ is given in Equation (1) below, where N is the total number of the non-intra coded macroblocks contributing to the distribution over one or more frames. The threshold is then set as follows:

$$Threshold_{16\times16} = \overline{SAR_{16\times16}} + q\sigma_{16\times16}. \quad (1)$$

$$\sigma_{16\times16} = \sqrt{\frac{1}{N}\sum_{i=1}^{i=N}(SAR_{16\times16} - \overline{SAR_{16\times16}})^2}$$

where "q" is a scalar. In one embodiment, q is 1.0. For further partitions of a sub-block, such as from 8×8 to 4×4 sub-blocks, the thresholds are set up by directly dividing $Threshold_{16\times16}$ by K, where K=4 for 8×8 blocks. The value of K is linearly reduced based on the size of the block to be partitioned. While there exists a linear relationship of average SARs at three different sizes:

$$\overline{SAR_{16\times16}} = \frac{1}{4}\overline{SAR_{8\times8}} = \frac{1}{16}\overline{SAR_{4\times4}},$$

the standard deviations of three block sizes are not linear. One reason for not computing standard deviations for block size 8×8 and 4×4 is that H.263 only has motion estimation for 16×16 macroblock sizes and the standard deviations of 8×8 and 4×4 cannot demonstrate the distribution of the 8×8 and 4×4 in the sense of motion estimation.

A further refinement of the thresholds for block sizes 8×8 and 4×4 can be made by using a factor or weight parameter (e.g., q) in front of $\sigma_{16\times16}$. For instance, in some embodiments, q may take on values of 1.5, 1.7, etc., among other values.

In some embodiments, the relationship of the picture quantization (non-intra) and $SAR_{16\times16}$ average may influence the threshold determination (e.g., the actual picture quantization level is used to determine the value of q).

Having described the thresholding features of the CBMRE module 204 (e.g., threshold set-up module 314), attention is now directed to the skip mode features of the CBMRE module 204 (e.g., skip mode decision module 318). Skip mode is used prevalently in the slow motion sequences, like those often present in video conferencing. When the skip mode is chosen, the skip mode decision module 318 provides a signal to the AVC encoder 206 (e.g., to the CRME module 336). For a given MB, the skip mode is decoded in decoder 202 by using the predicted motion vectors (PMV) as the motion vector of the block and zeros as the transform coefficients. Referring to FIGS. 5A and 5B for illustration, SMD 318 decides if skip mode is to be selected for the current macroblock 502 according to the following:

1. The $SAR_{16\times16}$ of the macroblock 502 and the neighboring three macroblocks (the B 504, C 506, and D 508 macroblocks in FIG. 5A are compared to $Threshold_{16\times16}$. If all four macroblocks 502, 504, 506, and 508 satisfy $SAR_{16\times16}$<$Threshold_{16\times16}$, then processing proceeds to step 2 below;

2. Compute the PMV of this 16×16 macroblock 502, which is the median of the motion vectors of the macroblocks immediately above (macroblock B 504), diagonally above and to the right (macroblock C 506) and immediately left (macroblock D 508) of the current macroblock A 502. This PMV computation pattern is the same as that in AVC. A check is performed to determine if the H.263 motion vector, $MV_{16 \times 16}$, is equal to the PMV, $PMV_{16 \times 16}$. If equal, processing proceeds to step 3 below;

3. Check if the quantized DCTs (QDCTs) of this macroblock A 502 are all equal to zeros.

Another condition of deciding on the skip mode is that the reference frame is the previous one which is the only choice in H.263. Since the video conferencing is most likely slow motion sequence, the motion refinement by employing multiple reference frames is not included in the above step mode decision process.

If the current macroblock A 502 satisfies the above three conditions, the skip mode is selected and the signal is sent to the AVC encoder 206 (e.g., CRME module 336) as guidance to motion estimation. If skip mode is not chosen, further mode decision (e.g., implemented in one embodiment by mode decision module 316) needs to be made, as set forth by the processing described below (Cases 1-4) and described in association with FIGS. 6A-6B.

Case 1: For a current macroblock, if $SAR_{16 \times 16}$<$Threshold_{16 \times 16}$, but does not satisfy the other conditions for skip mode as explained above, the H.263 $MV_{16 \times 16}$ is reused in the AVC encoding process as guidance. That is, the motion vector is good enough and no further partition is necessary.

Case 2: For the current macroblock, if $SAR_{16 \times 16}$>$Threshold_{16 \times 16}$, the macroblock is further partitioned into four 8×8 blocks 602, 604, 606, and 608 as conceptually shown in FIG. 6A. Shown in FIG. 6A is 16×16 motion vector 610 and a corresponding motion vector 612 for one of the 8×8 quadrants of the MB. The SAR for each of the 8×8 blocks are recomputed and compared to $Threshold_{8 \times 8}$. For the block whose $SAR_{8 \times 8}$<$Threshold_{8 \times 8}$, the motion vector 612 for this 8×8 block is obtained by mapping the corresponding motion vector for the 8×8 from the $MV_{16 \times 16}$ 610 as conceptually shown in FIG. 6A with $MV_{8 \times 8}$ 612. The $MV_{8 \times 8}$ 612 is mapped from the $MV_{16 \times 16}$ 610 by simple index calculation.

Case 3: For blocks where $SAR_{8 \times 8}$>$Threshold_{8 \times 8}$, such blocks are further partitioned into 4×4 blocks. Shown conceptually in FIG. 6B is 16×16 motion vector 614 and corresponding 4×4 motion vector 616. The SAR of each 4×4 block is computed and compared to $Threshold_{4 \times 4}$. If $SAR_{4 \times 4}$<$Threshold_{4 \times 4}$, the $MV_{4 \times 4}$ 616 is obtained again by mapping from the $MV_{16 \times 16}$ 614 as conceptually illustrated in FIG. 6B.

Case 4: If the $SAR_{4 \times 4}$>$Threshold_{4 \times 4}$, the motion vector for this 4×4 block may be used in AVC encoder 206 as an offset of the search space to perform motion estimation, such as with a spiral pattern search around the motion vector that was not good enough, as explained below.

Note that for some first video coding specifications, skip mode is provided as a syntax element.

Figure 7:
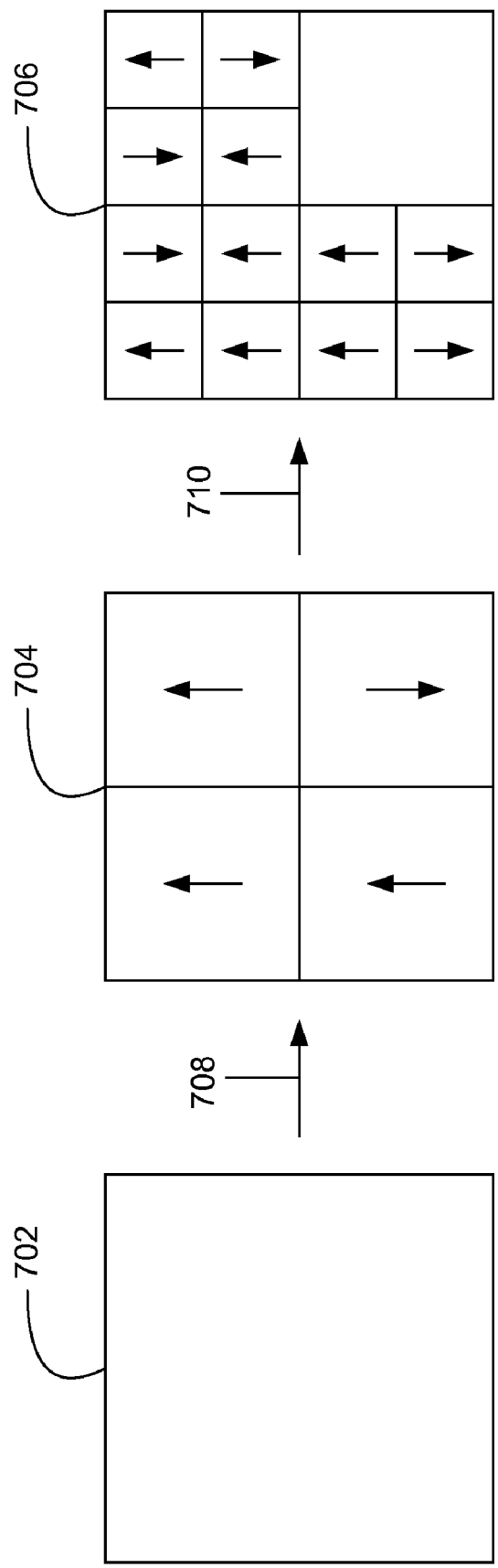
FIG. 7 is a composite block diagram that illustrates an example partition process and mode decision.

A conceptual illustration of an example process of mode selection is shown in FIG. 7. Blocks 702, 704, and 706 correspond to illustrations of a 16×16 block, partitioned further into four 8×8 block, and further into 4×4 blocks, respectively. The transition 708 between the 16×16 block to the 8×8 blocks corresponds to the determination that SAR of the 16×16 macroblock is greater than (>) the 16×16 threshold. The transition 710 between the 8×8 blocks to the 4×4 blocks corresponds to the determination that the SAR of an 8×8 macroblock is greater than (>) the 8×8 threshold. By mapping the corresponding motion vectors $MV_{8 \times 8}$ and $MV_{4 \times 4}$ from $MV_{16 \times 16}$, the available H.263 motion information is largely reused. For MBs along the border of the picture and high motion blocks, the motion vectors are re-estimated, as described below.

Figure 8:
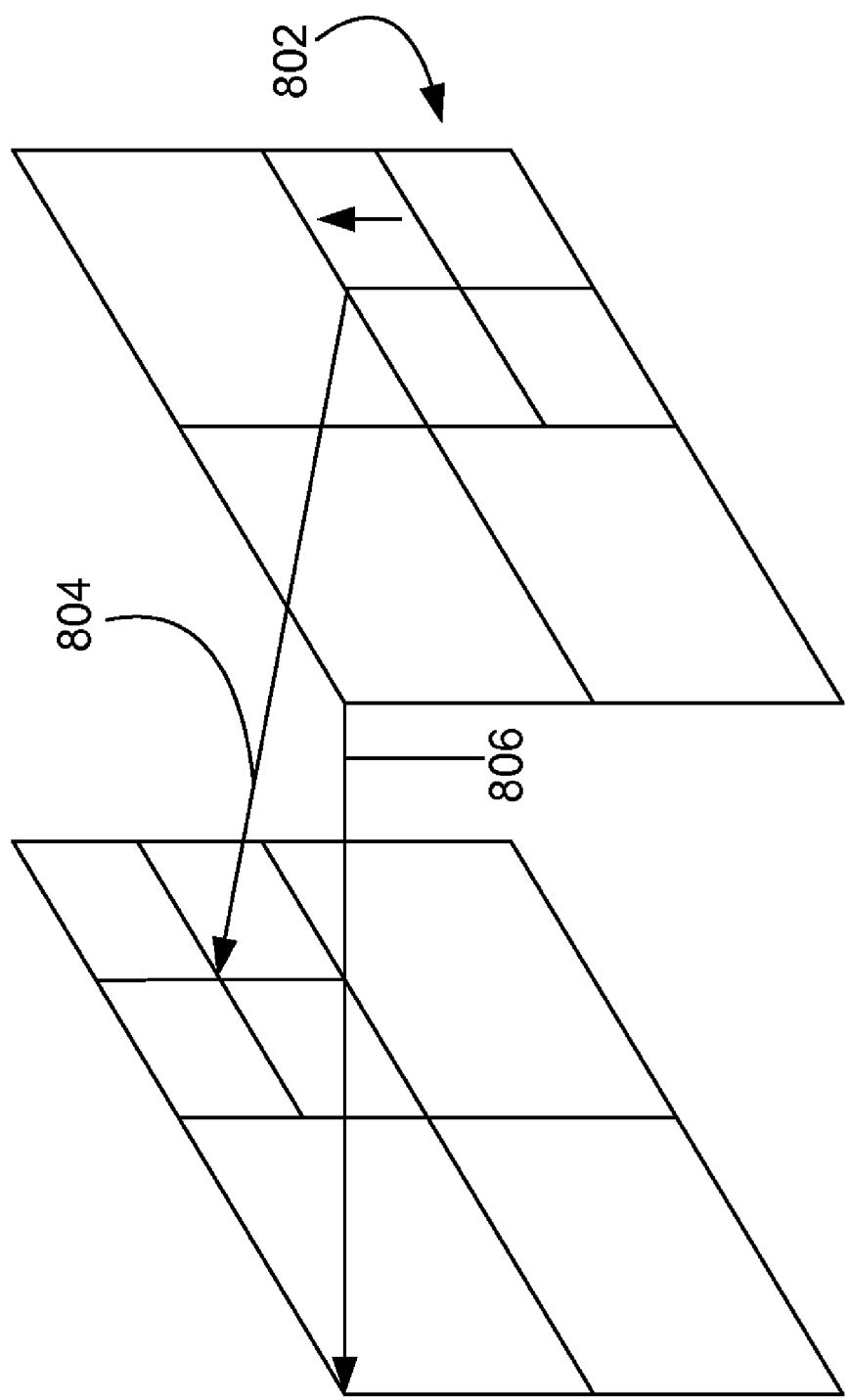
FIG. 8 is a block diagram that conceptually illustrates an example motion vector decision for a 4×4 block.

Having described the mode decision features of the CBMRE module 204, attention is directed to motion vector re-estimation (e.g., as implemented in one embodiment by motion vector re-estimation module 320) as conceptually illustrated in FIG. 8. The motion vector re-estimation is conducted for those 4×4 blocks (e.g., 4×4 block 802) exhibiting $SAR_{4 \times 4}$>$Threshold_{4 \times 4}$. In one embodiment, the offset for the search space is decided by choosing between $\widetilde{MV_{4 \times 4}}$ 804 and $PMV_{4 \times 4}$. $\widetilde{MV_{4 \times 4}}$ 804 is the corresponding motion vector mapped from $MV_{16 \times 16}$ 806, while $PMV_{4 \times 4}$ is the predicted motion vector for the current 4×4 block and is computed as the median of the motion vectors of the neighboring blocks immediately above, diagonally above and to the right, and immediately left of the current block (e.g., as conceptually shown in FIG. 5B). If some of the neighboring blocks are not available, such as the blocks on the border of the frame, $PMV_{4 \times 4}$ is computed as the median of the remaining available neighboring blocks only. The candidate motion vector chosen between $\widetilde{MV_{4 \times 4}}$ and $PMV_{4 \times 4}$ for the search space offset is according to which one results in the smallest SAD. Once an offset is decided, a spiral pattern search is conducted. The offset for the search space is given by Equation (2):

$$\text{Initial}(MV_{4 \times 4}) = \text{Min}_{MV}(SAD_{\widetilde{MV_{4 \times 4}}}, SAD_{PMV_{4 \times 4}}) \qquad (2)$$

Figure 9:
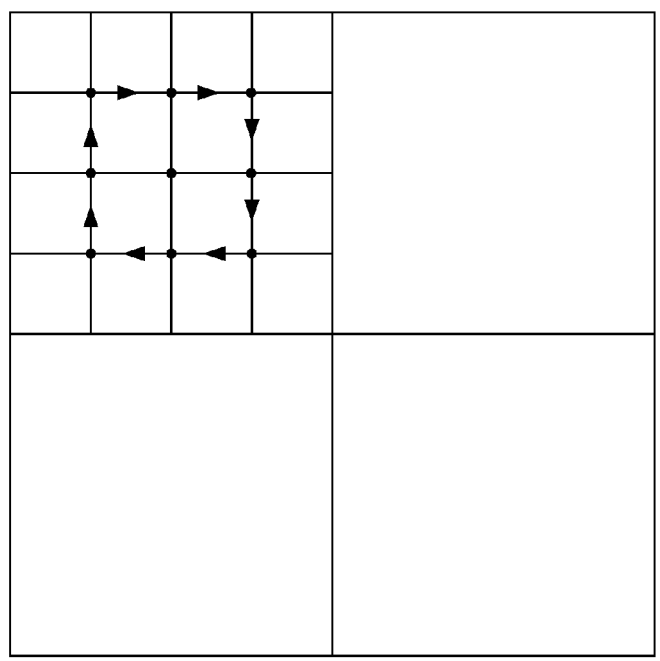
FIG. 9 is a block diagram that conceptually illustrates an example spiral motion search.

The number of candidate motion vectors, or number of layers in the spiral motion search, may be determined by the magnitude of SAR of the 4×4 and/or the SAR of the 16×16 MB. An example of deciding the initial motion vector and conducting the following spiral motion search are conceptually shown in FIGS. 8 and 9, respectively. For each search point, the $SAD_{4 \times 4}$ is computed and compared to $Threshold_{4 \times 4}$. As soon as a motion vector resulting in $SAD_{4 \times 4}$<$Threshold_{4 \times 4}$ is reached, the searching process stops and this motion vector is selected as the new $MV_{4 \times 4}$. In some embodiments, to avoid unlimited searching, the spiral search space is limited to 5×5.

In one embodiment, the initial motion vector (or offset) is provided by CBMRE 204 and the spiral motion estimation is conducted by CRME 336 in AVC encoder 206.

In one embodiment, the spiral motion estimation is conducted on both search spaces corresponding to the PMV and the MV or a search space demarcated by the intersection of two search spaces corresponding to the PMV and the MV.

Figure 10:
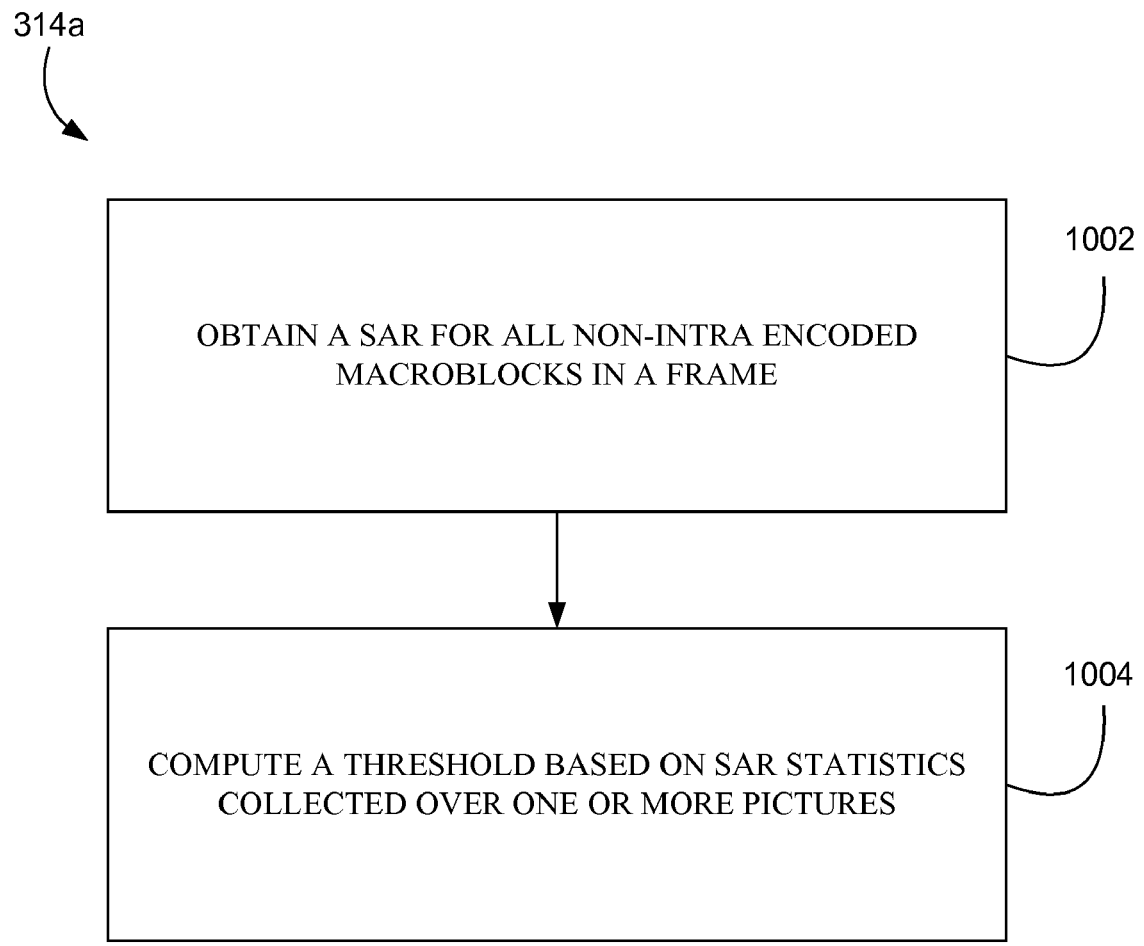
FIG. 10 is a flow diagram of an embodiment of a thresholding method.

Having described the CBMRE module 204 and the associated methods, it should be appreciated in the context of the present disclosure that one thresholding method embodiment 314a, illustrated in FIG. 10, comprises obtaining a SAR for all non-intra encoded macroblocks in a frame (1002), and computing a threshold based on SAR statistics collected over one or more pictures (1004). In such an embodiment, the threshold is set at the standard deviation to the right of the SAR mean or a scalar factor of the standard deviation. In some embodiments, macroblocks having zero residual signals do not contribute towards the SAR statistics collection. In some embodiments, macroblocks corresponding to zero residual signals do count towards the SAR statistics and computation of the threshold. For block sizes smaller than 16×16, a factor or weighting may be applied in the threshold determination.

Figure 11:
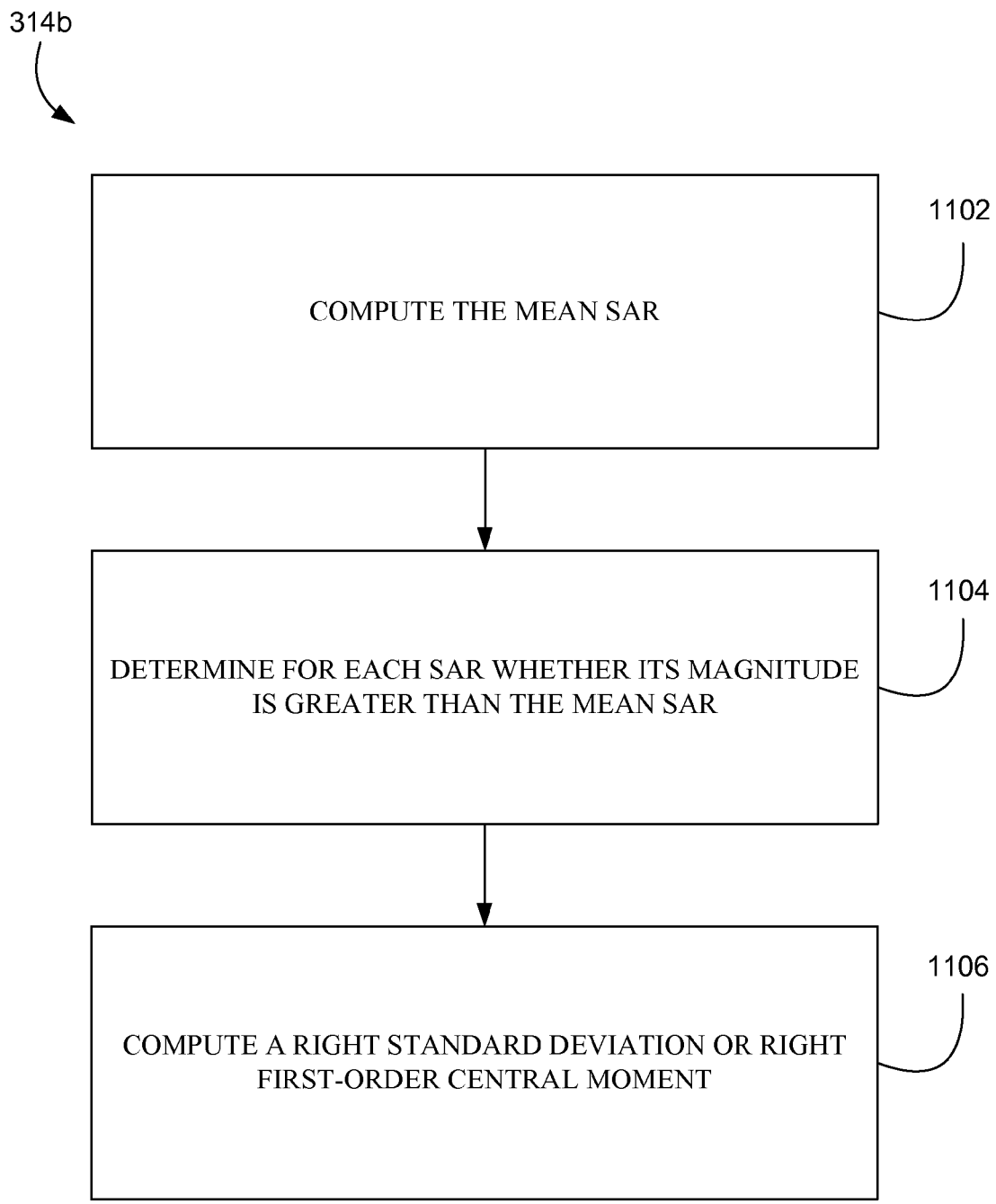
FIG. 11 is a flow diagram of another embodiment of a thresholding method.

Another thresholding method embodiment 314b, shown in FIG. 11, comprises computing the mean SAR (1102), determining for each SAR whether its magnitude is greater than the mean SAR (1104), and computing a right standard deviation or right first-order central moment, which in turn results in computing a threshold that is based only by those MBs having SARs above the mean SAR (1106). In other words, the standard deviation used for the threshold can be computed from only macroblocks that have 16×16 SAR values greater than the mean $SAR_{16\times16}$. In this manner, perfect matches (block matching) do not influence the computation of the threshold. For smaller block sizes (i.e., where further partitioning occurs due to values above the threshold), a factor or weighting is applied in the threshold determination.

The right standard deviation of the SAR distribution is computed by modifying equation (1), such that N is replaced by $N_R$, the number of MBs having a SAR greater than (or greater than or equal to, ≧) the mean SAR, and only including in the equation's computations those SARs (greater than the mean SAR).

Figure 12:
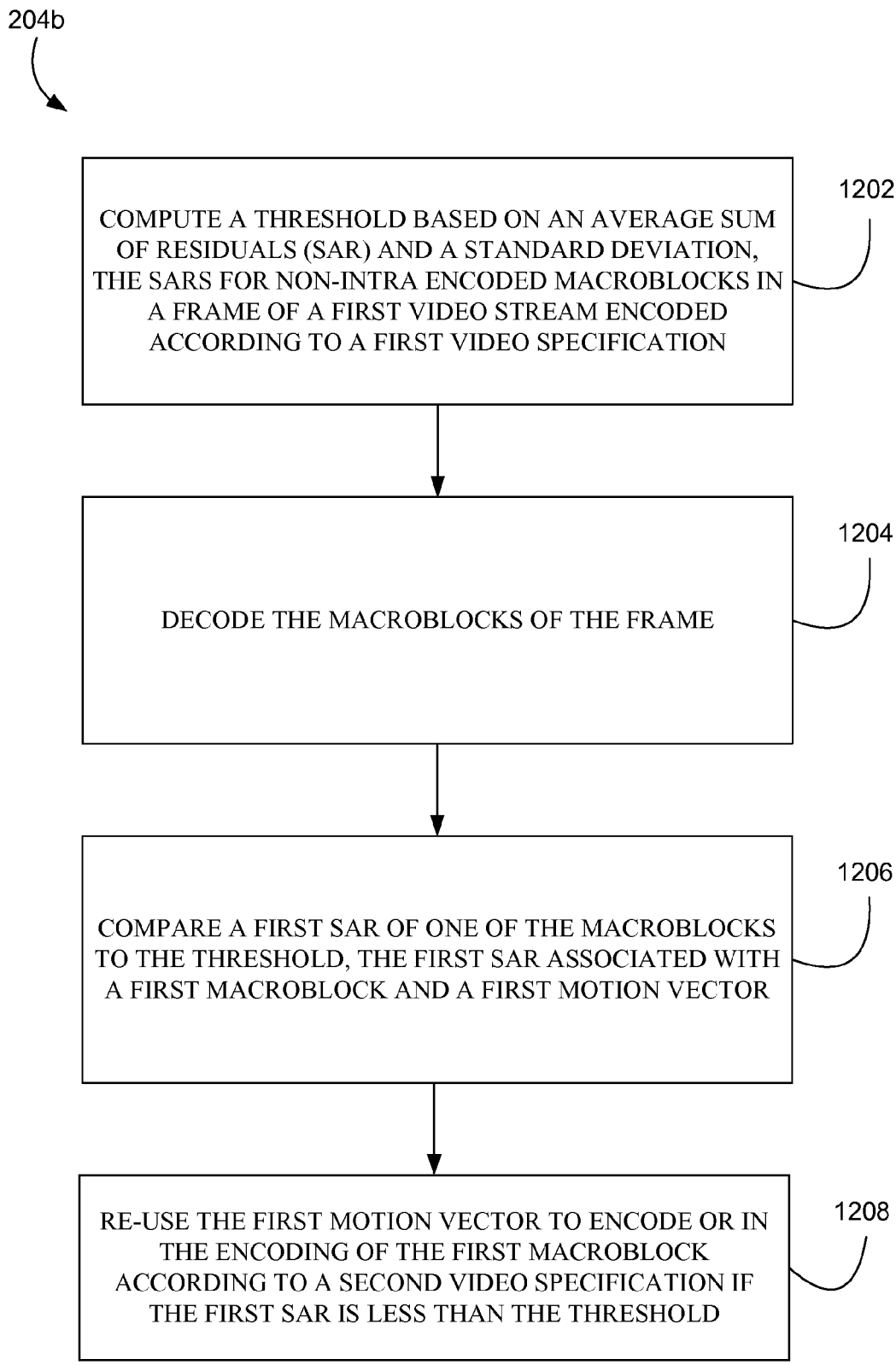
FIG. 12 is a flow diagram of an embodiment of a transcoding method.

It should be appreciated that one transcoding method embodiment 204b implemented by the CBMRE module 204, and shown in FIG. 12, comprises computing a threshold based on an average sum of residuals (SAR) and a standard deviation, the SARs for non-intra encoded macroblocks in a frame of a first video stream encoded according to a first video specification (1202), decoding the macroblocks of the frame (1204), comparing a first SAR of one of the macroblocks to the threshold, the first SAR associated with a first macroblock and a first motion vector (1206), and re-using the first motion vector to encode or in the encoding of the first macroblock according to a second video specification if the first SAR is less than the threshold (1208).

Note that in some embodiments, different thresholding can be applied for different picture types. For instance, video conferencing typically uses small picture resolutions. Accordingly, in some embodiments, the statistics may be based on the mean $SAR_{16\times16}$ for different types of pictures (e.g., not just P pictures) and treated differently (e.g., kept or collected separately for different types of pictures). In some embodiments, there may be further delineation within picture types (e.g., separate means recorded based on number of reference pictures used, such as separate statistics collection for P-type or B-type pictures depending on how many reference pictures are used).

In some embodiments, thresholding may be based on SAR of macroblocks from plural pictures (versus a single picture or frame). The statistics may be kept for the last few pictures of the same type (e.g., collected for the same last N pictures of the same type), or until a scene change is detected (e.g., statistics collection may restart at scene change or after scene change detection). For instance, the number of macroblocks in the smaller pictures used in video conferencing may not be sufficient for statistics to have significance or to be meaningful, and hence, more samples may be required (e.g., continuously collect the previous 3-4 frame statistics to obtain a better threshold).

The CBMRE module 204 (and components thereof) can be implemented in hardware, software, firmware, or a combination thereof. In software or firmware embodiments, functionality of the CBMRE module 204 is stored in a memory and executed by a suitable instruction execution system. In hardware embodiments, the CBMRE module 204 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow diagrams (e.g., FIGS. 10-12) should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, depending on the functionality involved, as would be understood by those reasonably skilled in the art.

In software or firmware embodiments, functionality of the CBMRE module in the form of a program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of an embodiment of the present disclosure includes embodying the functionality of the embodiments of the present disclosure in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
   computing on a transcoding system a threshold based on an average sum of absolute residual (SAR) values and a standard deviation, each SAR corresponding to the sum of absolute values of the residual signal of a non-intra encoded macroblock in a frame of a first video stream encoded according to a first video specification;
   decoding on the transcoding system the macroblocks of the frame;
   comparing on the transcoding system a SAR of one of the macroblocks to the threshold, the one of the macroblocks having a first motion vector; and
   providing from the transcoding system the first motion vector for encoding the one of the macroblocks according to a second video specification if the SAR of the one of the macroblocks is less than the threshold.

2. The method of claim 1, wherein the average SAR represents the sum of absolute differences between the one of the macroblocks and its prediction from a reference picture.

3. The method of claim 1, wherein computing comprises disregarding macroblocks having a zero residual signal.

4. The method of claim 1, wherein computing comprises including macroblocks having zero residual signals as part of the computation of the threshold.

5. The method of claim 1, further comprising partitioning on the transcoding system the one of the macroblocks into first plural blocks and performing motion estimation on the first plural blocks if the SAR is greater than the threshold.

6. The method of claim 5, wherein the first plural blocks each have a size according to one of the following: 8×8, 16×8, or 8×16.

7. The method of claim 5, wherein performing the motion estimation further comprises determining on the transcoding system a second threshold based on the first plural blocks, the second threshold based on dividing the first threshold by a value K, where K=4 for 8×8 blocks, the second threshold further based on application of a first weight parameter applied to the standard deviation.

8. The method of claim 7, further comprising:
mapping on the transcoding system a second motion vector for one or more of the first plural blocks based on a mapping of the first motion vector if a SAR for the one or more of the first plural blocks is less than the second threshold; and
using the second motion vector to encode the first macroblock according to the second video specification.

9. The method of claim 7, further comprising partitioning on the transcoding system the one or more of the first plural blocks into second plural blocks and performing motion estimation on the one or more of the second plural blocks if the SAR for the one or more of the first plural blocks is greater than the threshold, wherein the second plural blocks each have a size according to one of the following: 4×4, 8×4, or 4×8.

10. The method of claim 9, wherein performing the motion estimation on the one or more of the second plural blocks further comprises determining a third threshold based on the one or more of the second plural blocks, the third threshold based on dividing the first threshold by a value K, where K=16 for 4.times.4 blocks, the third threshold further based on application of a second weight parameter applied to the standard deviation.

11. The method of claim 10, further comprising:
mapping on the transcoding system a third motion vector for the one or more of the second plural blocks based on a mapping of the first motion vector if a SAR for the one or more of the second plural blocks is less than the third threshold; and
using the third motion vector to encode the first macroblock according to the second video specification.

12. The method of claim 10, further comprising re-estimating on the transcoding system a motion vector for the one or more of the second plural blocks.

13. The method of claim 1, wherein computing further comprises computing a mean SAR, determining for each SAR whether its magnitude is greater than the mean SAR, and computing a right standard deviation or right first-order central moment.

14. The method of claim 1, wherein computing further comprises obtaining the SAR for all non-intra encoded macroblocks in a frame, and computing the threshold based on SAR statistics collected over one or more pictures.

15. The method of claim 1, further comprising computing the threshold based on residual signals corresponding to non-intra encoded macroblocks in plural frames.

16. The method of claim 1, wherein computing, comparing, and re-using are performed separately for different picture types.

17. The method of claim 1, further comprising determining on the transcoding system if skip mode is to be selected for a second macroblock associated with a second motion vector and a second residual, wherein determining comprises:
comparing a SAD corresponding to the second macroblock and a SAD corresponding to neighboring macroblocks with the first threshold;
if the SAD corresponding to the second macroblock and all of the neighboring macroblocks is less than a second threshold, compute a predicted motion vector (PMV) of the second macroblock; and
if the PMV equals the second motion vector, the skip mode is selected if a quantized DCT of the second macroblock equals zero.

18. A system, comprising:
a re-estimation module for computing a threshold based on an average sum of residuals (SAR) and a standard deviation, the SARs for non-intra encoded macroblocks in a frame of a first video stream encoded according to a first video specification;
a decoder for decoding the macroblocks of the frame;
the re-estimation module further configured for comparing a first SAR of one of the macroblocks to the threshold, the first SAR associated with a first macroblock and a first motion vector; and
the re-estimation module further configured for re-using the first motion vector to encode or in the encoding of the first macroblock according to a second video specification if the first SAR is less than the threshold.

* * * * *